United States Patent [19]
Thorpe

[11] Patent Number: 5,380,025
[45] Date of Patent: Jan. 10, 1995

[54] TILT STEERING MECHANISM FOR A RECUMBENT BICYCLE

[76] Inventor: Richard B. Thorpe, 2855 Pinecreek Dr. #C108, Costa Mesa, Calif. 92626

[21] Appl. No.: 190,346

[22] Filed: Feb. 2, 1994

[51] Int. Cl.⁶ .......................................... B62K 21/18
[52] U.S. Cl. .................... 280/270; 280/288.1; 280/263
[58] Field of Search ............ 280/270, 278, 287, 288.1, 280/263, 240

[56] References Cited

U.S. PATENT DOCUMENTS

| | | | |
|---|---|---|---|
| D. 278,324 | 4/1985 | Breen | 280/288.1 X |
| 2,482,472 | 9/1949 | Fried | 280/288.1 X |
| 3,336,817 | 8/1967 | Madden | 75/552 |
| 3,511,521 | 5/1970 | Gobini | 280/270 |
| 3,533,305 | 10/1970 | Hill | 74/551.3 |
| 4,108,460 | 8/1978 | Silva | 280/236 |
| 4,431,203 | 2/1984 | DeMoss | 280/270 |
| 4,527,811 | 7/1985 | DeMoss | 280/288.1 |
| 4,540,189 | 9/1985 | Tanaka | 280/270 |
| 4,541,647 | 9/1985 | Braun | 280/270 X |
| 5,261,686 | 11/1993 | Buckler | 280/288.1 X |
| 5,284,351 | 2/1994 | Fleishman | 280/288.1 X |

OTHER PUBLICATIONS

Popular Science, Jan. 1994, p. 18 "Comfort Class".

*Primary Examiner*—Brian L. Johnson
*Assistant Examiner*—F. Zeender
*Attorney, Agent, or Firm*—Knobbe, Martens, Olson & Bear

[57] ABSTRACT

A tilt steering mechanism facilitating a large degree of rider position adjustment is provided for use in connection with a short wheel base recumbent bicycle. Bicycle comprises a front steerable wheel, and a foot pedal driving mechanism rotatably mounted to a frame such that the axis of the foot pedal driving mechanism is located forward of the rear most point of the front steerable wheel. A tilt steering mechanism rotatably mounted to a frame and located rearward of the axis of a foot pedal driving mechanism. Tilt steering mechanism comprising a fore aft tilt body, a steering lever body, rotational antifriction bearings, and a ball and socket joint or similar joint mechanism. The fore aft tilt body is rotatably connected to a bicycle frame whereby the fore aft tilt body may pivot about a pivot axis parallel to the axis of the foot pedal driving mechanism. The steering lever body is rotatably connected to the stem of the fore aft tilt body by rotational antifriction bearings whereby the steering lever body may pivot about a pivot axis substantially orthogonal to the axis of the rotational antifriction bearings. A ball and socket joint or similar joint mechanism is mounted on the steering lever body such that with the steering lever body in a substantially neutral steering position, the approximate rotational center of the ball and socket joint lies substantially on the pivoting axis of the rotatably frame mounted fore aft tilt body whereby fore aft adjustment of the steering mechanism will not affect movement of the front steerable wheel.

8 Claims, 5 Drawing Sheets

TILT STEERING MECHANISM FOR A RECUMBENT BICYCLE

FIELD OF THE INVENTION

This invention relates generally to bicycles, and more particularly to steering mechanisms for recumbent bicycles with a pedal crank assembly mounted forward of the rear most point of a front steerable wheel.

DESCRIPTION OF THE PRIOR ART

Recumbent bicycles differ from conventional bicycles in that the semi-recumbent bicycle is constructed so that it may be operated by the rider from a reclining or semi-reclining position. The rider sits behind the pedals in a seat which is usually provided with a backrest, in a relatively horizontal position rather than the more vertical position normally assumed by the rider of a conventional bicycle. Within the field of recumbent bicycles, there are generally two design layouts: long wheel base recumbents—bicycles with pedal cranks mounted behind the front steerable wheel—and short wheel base recumbents—bicycles with pedal cranks mounted ahead of the front steerable wheel. Currently, recumbent bicycles are designed with a relatively fixed rider position. Steering mechanisms for these bicycles are rigidly fixed to the bicycle's frame. While the rider and bicycle are in motion, the rider position does not move to a large degree; therefore, other than left and right steering control, there is no need for any adjustability in the steering mechanism.

A relatively fixed rider position is a compromise between aerodynamics, rider comfort, and the rider's ability to use his/her muscles efficiently and powerfully. The rider's priority of aerodynamics, comfort and power changes constantly while the rider and the bicycle are in motion. For instance, top speed on straight, level ground is limited primarily by aerodynamics; a laid back rider position is desirable. When climbing hills, the limiting factor for speed is power; in order to use larger, more powerful leg muscles, the rider must have an extremely hunched over body position. Neither one of the previous rider positions is optimal for city riding or comfortable touring; therefore, a position that compromises aerodynamics and power is desirable. Generally, having the ability to adjust the rider's position to a large degree (leaning the upper body, including arms, forwards or backwards) while the rider and bicycle are moving will render one of three advantages to the rider and bicycle in aerodynamics, comfort or more efficient use of the rider's muscles.

It is important to note that the advantages mentioned above will only be fully realized when riding a short wheel base recumbent. Unfortunately, because the state of the art steering mechanisms of short wheel base recumbents are rigidly fixed to the bicycle's frame, they do not allow for a large degree of adjustability of the rider position while the bicycle and rider are in motion. Should the rider attempt to adjust his/her position to a large degree on a short wheel base recumbent bicycle with a fixed steering mechanism of today, his/her ability to maintain hold and control the steering mechanism will be compromised or completely impossible.

In the past, some attempts at inventing a steering mechanism that provides some adjustment have been made; unfortunately, any adjustment in all of these old designs would not render any significant advantage to the rider and bicycle in aerodynamics, comfort or power. In addition, none of the prior art references practically and efficiently facilitate a large amount of adjustment while the rider and bicycle are in motion. The prior art reference on page 18 of Popular Science magazine (January 1994 issue) describes a recumbent bicycle having ". . . an adjustable steering system that tilts to accommodate different arm lengths and torso sizes . . . . " Clearly, the steering mechanism described is designed to provide adjustment for different rider sizes and not for a single rider varying his/her rider position while he/she and the bicycle are in motion. In addition, the bicycle shown is a long wheel base recumbent bicycle. On a short wheel base recumbent bicycle, tilt steering mechanism must be located substantially behind the pedal cranks and the front wheel. The steering mechanism of the Popular Science reference above is located forward of the pedal cranks. Adjustment of this steering mechanism will not render any substantial improvements to the rider and bicycle in aerodynamics, comfort or speed. U.S. Pat. Nos. 4,528,811 (1985) and 4,431,203 (1984) to DeMoss show similar steering arrangements for a recumbent bicycle. The steering arrangements shown are rigidly fixed to the bicycle's frame and allow no adjustment other than left right steering control. Another limitation of the steering arrangements depicted is their apparent use only with long wheel base recumbent bicycles. U.S. Pat. No. 4,108,460 to Silva (1978) is another steering system design for use with a long wheel base recumbent bicycle. This steering system is also rigidly fixed to the bicycle's frame. U.S. Pat. No. 3,53,305 to Hill (1970) and U.S. Pat. No. 3,336,817 to Madden (1965) are most certainly novelty steering wheel designs for use only with a traditional diamond frame starley bicycle. Both inventions provide little fore aft adjustment and would not render any substantial improvements to the rider and bicycle in aerodynamics, comfort or speed. All of the prior art steering mechanism designs are simply not designed for allowing the rider to gain an advantage in aerodynamics, comfort or power.

It is important to note that all of the prior art steering mechanisms cited are not designed for use with a short wheel base recumbent. They are related long wheel base recumbents or conventional diamond frame starley bicycles.

The chances of a traditional bicycle designer discovering a tilt steering mechanism that afford "in-motion" fore aft adjustability are slim. Tilt steering mechanisms that allow "in-motion" adjustment have not been discovered before primarily because they would only benefit short wheel base recumbents and these bicycles are relatively small in number and new in design compared with conventional diamond frame starley bicycles.

SUMMARY OF THE INVENTION

Accordingly, the object of my tilt steering mechanism is to facilitate a large degree of adjustability of a rider's position without compromising or affecting comfort or steering control of a short wheel base recumbent bicycle. Having the ability to adjust the rider's position to a large degree while the rider and a short wheel base recumbent bicycle are moving will render at least one of three improvements to the rider and bicycle in aerodynamics, comfort or more efficient use of the rider's muscles. A new tilt steering mechanism, such as my invention, will enable the rider to maintain comfortable steering control throughout a large range of different rider positions on the bicycle. Because my new tilt steering mechanism allows both fore and aft adjustment of the handlebars, and left and right steering control of the bicycle, the rider will have the freedom to change his/her position relative to the bicycle as his/her priorities of aerodynamics, comfort and power change. If the rider adjusts his/her position to a large degree (leaning upper body, including arms, forwards or backwards), such as to gain an advantage in aerodynamics, comfort or power, an advanced tilt steering mechanism, such as my invention, will adjust in relation to the new position of the rider's hands and arms thus enabling the rider to maintain hold and control of the bicycle's steering.

Conclusively, when adapted for use with a short wheel base recumbent bicycle, the tilt steering mechanism described in this patent provides for a large amount of adjustability of the rider position without compromising or affecting steering comfort or control. Further objects and advantages of my tilt steering mechanism will become apparent from a consideration of the drawings and ensuing description.

REFERENCE NUMERALS IN DRAWINGS

Figure 1:
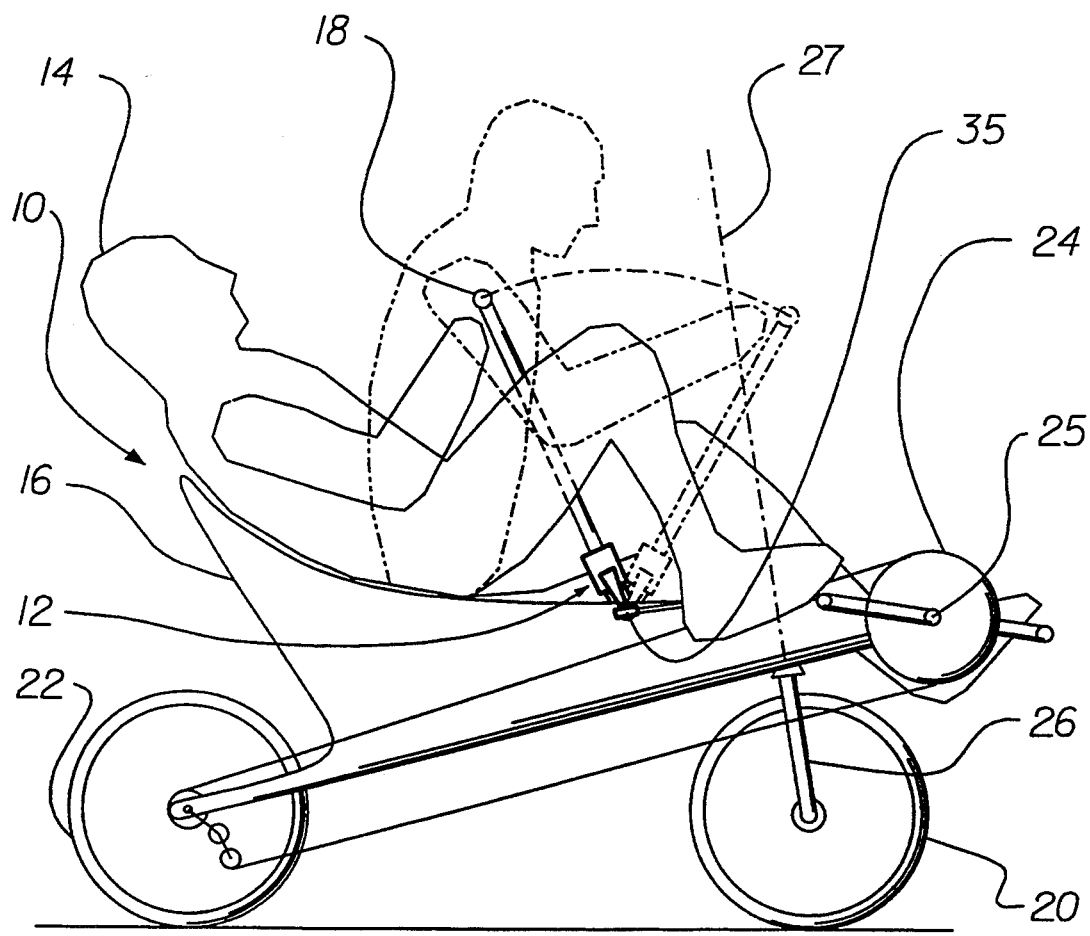
FIG. 1 is a side view of a short wheel base recumbent bicycle incorporating my tilt steering mechanism.

10 Short wheel base recumbent bicycle
12 Tilt steering mechanism
14 Rider
16 Frame
18 Handlebar element
20 Front steerable wheel
22 Rear wheel
24 Foot pedal driving mechanism
25 Foot pedal axis
26 Front steerer tube fork assembly
27 Front steerer tube axis
28 Steerer tube lever
30a Ball and socket joint
30b Ball and socket joint
32 Connecting rod
34 Fore aft tilt body
35 Fore aft pivot axis
36 Steering lever body
40a Rotational antifriction bearing
40b Rotational antifriction bearing
41 Rotational antifriction bearing axis

DESCRIPTION OF THE PREFERRED EMBODIMENTS

Referring now to the drawings, the tilt steering mechanism of the instant invention is illustrated and generally indicated at 12 in FIG. 1. As illustrated, the tilt steering mechanism 12 is adapted for use in connection with a short wheel base recumbent bicycle 10 and a rider 14. Short wheel base recumbent bicycle 10 comprises a frame 16, a foot pedal driving mechanism 24, a front steerer tube fork assembly 26, a front steerable wheel 20, a rear wheel 22, tilt steering mechanism 12, and a handlebar element 18. Rear wheel 22 is rotatably mounted to the aft end of frame 16. Front steerable wheel 20 is rotatably mounted to the forked end of front steerer tube fork assembly 26 and front steerer tube fork assembly 26 is rotatably mounted to frame 16 about a substantially vertical front steerer tube axis 27. Foot pedal driving mechanism 24 is rotatably mounted to frame 16 such that a foot pedal axis 25 is forward of the rear most point of front steerable wheel 20. Tilt steering mechanism 12 is rotatably mounted to frame 16 rearward of foot pedal axis 25. Handlebar element 18 is mounted substantially vertical to tilt steering mechanism 12.

Figure 2:
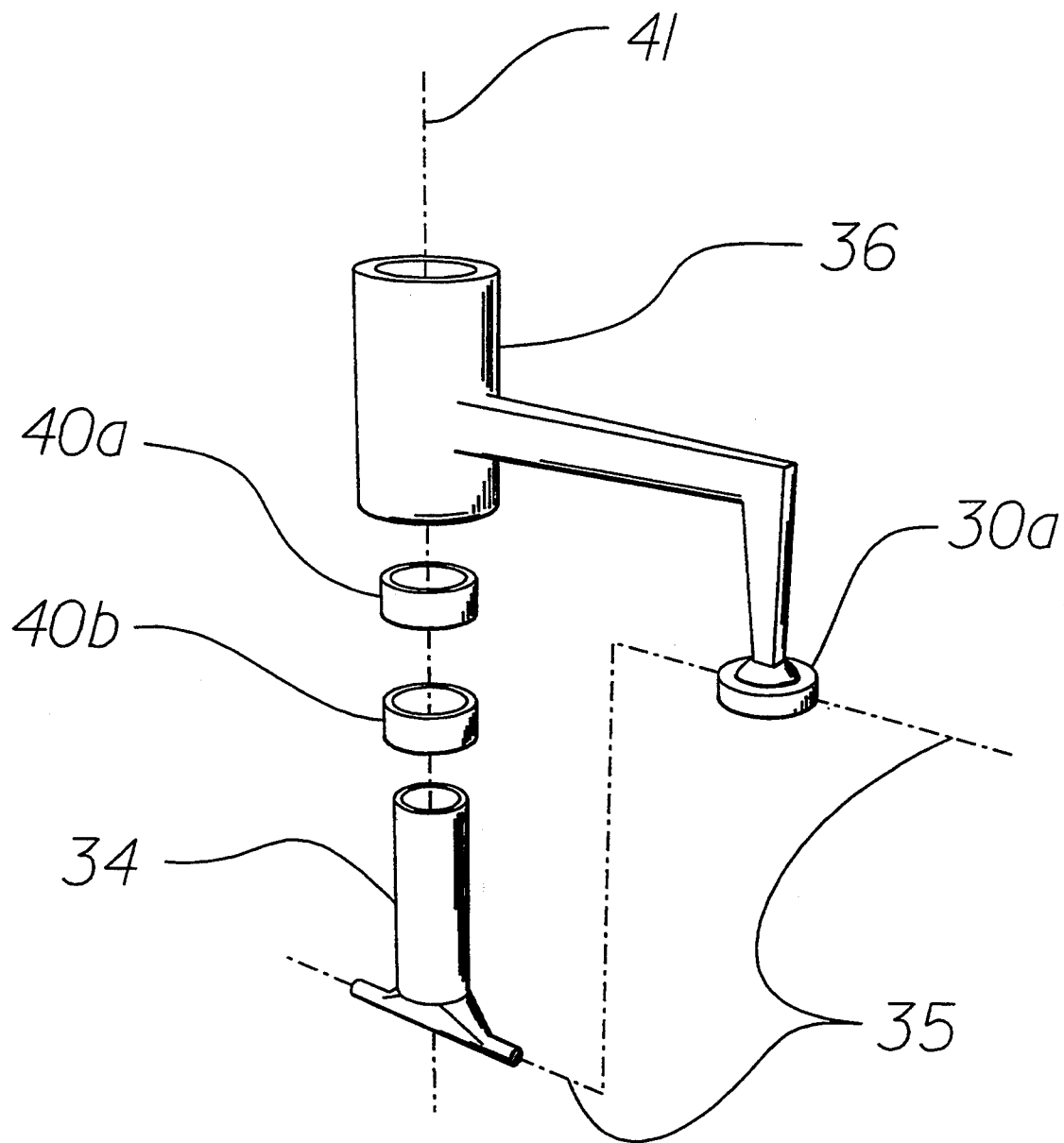
FIG. 2 is an exploded view of my tilt steering mechanism showing its shape and composition.

FIG. 2 is an exploded view showing tilt steering mechanism 12. Tilt steering mechanism 12 comprises a fore aft tilt body 34, a steering lever body 36, rotational antifriction bearings 40a and 40b, and a device having at least two degrees of rotational movement, such as a ball and socket joint 30a. Fore aft tilt body 34 is substantially in but not limited to the shape of an inverted "T" and has a fore aft pivot axis 35. Fore aft tilt body 34 will preferably be a single piece of machined, cast or molded metal or composite material. Steering lever body 36 is rotatably connected to the generally upwardly pointing single leg of the "T" of the fore aft tilt body 34 by rotational antifriction bearings 40a and 40b. The nature of the connection between steering lever body 36, rotational antifriction bearings 40a and 40b, and fore aft tilt body 34 will preferably by an interference type fit or a glued fit. Steering lever body 36 is substantially in the shape of an inverted, three pronged pitchfork with one of the outer spikes removed. Like fore aft tilt body 34, steering lever body 36 will preferably be a single piece of machined, cast or molded metal or composite material. Ball and socket joint 30a is mounted preferably by weld, screwed, glued or interference connection on the tip of the outer fork of steering lever body 36 such that with steering lever body 36 located in the neutral steering position shown (i.e., bicycle 10 will travel in a substantially straight path), the approximate rotational center of ball and socket joint 30a lies substantially on a fore aft pivot axis 35.

Figure 3:
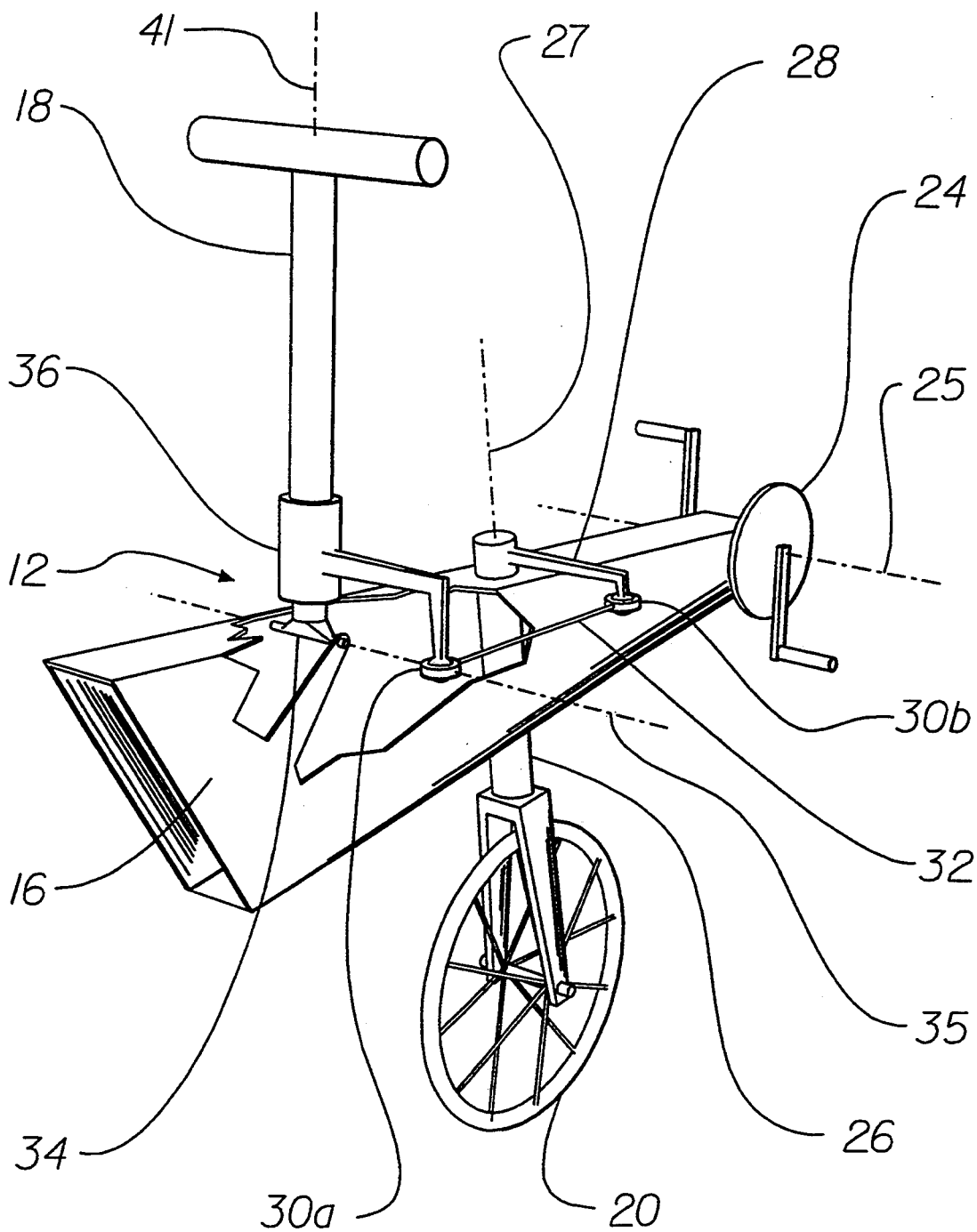
FIG. 3 is a perspective view of my tilt steering mechanism showing how and where it is mounted to a bicycle frame and how it connects to a front steerable wheel.

FIG. 3 is a detailed view showing how and where tilt steering mechanism 12 is mounted to bicycle frame 16. Tilt steering mechanism 12 is shown located in a substantially neutral steering position and rotatably mounted to frame 16. Fore aft tilt body 34 is rotatably mounted to frame 16 at a location rearward of foot pedal axis 25 and pivotal about fore aft pivot axis 35 which is substantially parallel to foot pedal axis 25. Handlebar element 18 of a substantially but not limited to upright "T" shape is rigidly mounted on the top of steering lever body 36. Ball and socket joint 30a is linked to a steerer tube lever 28 by a substantially rigid connecting rod 32 provided with an end mounted similar ball and socket joint 30b. Steerer tube lever 28 is rigidly mounted to front steerer tube fork assembly 26 at a substantially right angle to front steerer tube axis 27, whereby any rotational manipulation of handlebar element 18 about a rotational antifriction bearing axis 41 will effect a corresponding rotational movement of front steerable wheel 20 about front steerer tube axis 27.

OPERATION

Figure 4:
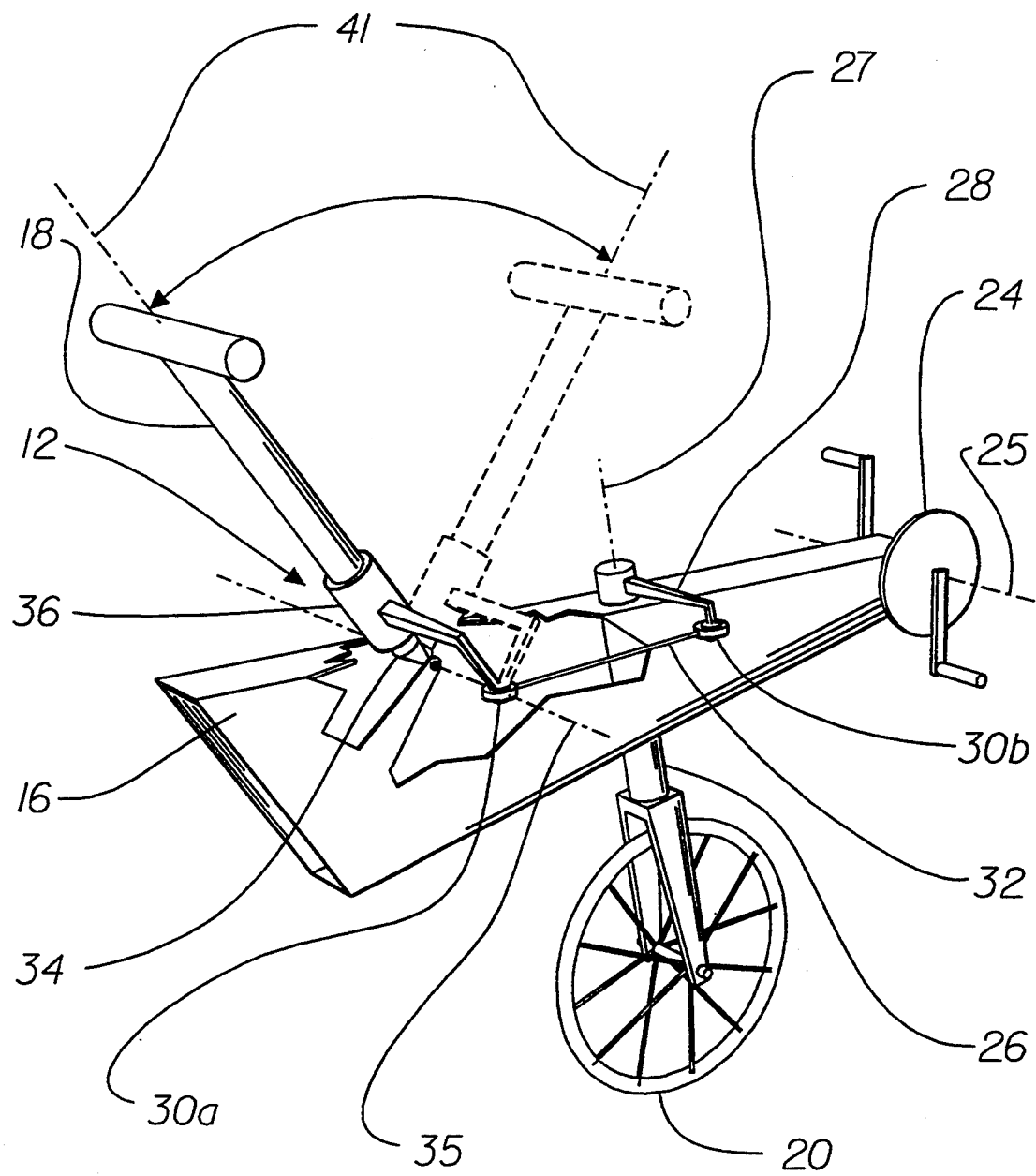
FIG. 4 is a perspective view showing the fore and aft adjustment operation of my tilt steering mechanism.

FIG. 4 shows the fore aft adjustment operation of tilt steering mechanism 12. Tilt steering mechanism 12 is shown in detail in FIG. 4 located in a substantially neutral steering position (i.e., bicycle 10 will travel in a substantially straight path). Generally, while handlebar element 18 is held in a substantially neutral steering position, handlebar element 18 may be adjusted fore and aft about fore aft pivot axis 35 without affecting movement of front steerable wheel 20. More specifically, when handlebar element 18 is made to adjust fore and aft by rotating about fore aft pivot axis 35, steering lever body 36 along with ball and socket joint 30a will be made to do the same. Provided handlebar element 18 is held in a substantially neutral steering position (i.e., no rotation of handlebar element 18 abut rotational antifriction bearing axis 41) and because ball and socket joint 30a is mounted to steering ever body 36 wherein the approximate rotational center of ball and socket joint 30a lies substantially on fore aft pivot axis 35, the approximate rotational center of ball and socket joint 30a will not move in relation to frame 16. Hence, connection rod 32 and end mounted similar ball and socket joint 30b will not move as to affect the steering of front steerable wheel 20. It is this fore aft adjustment operation of tilt steering mechanism 12 that allows rider 14 to adjust to a large degree his/her position relative to bicycle 10 without affecting or compromising his/her steering control.

Figure 5:
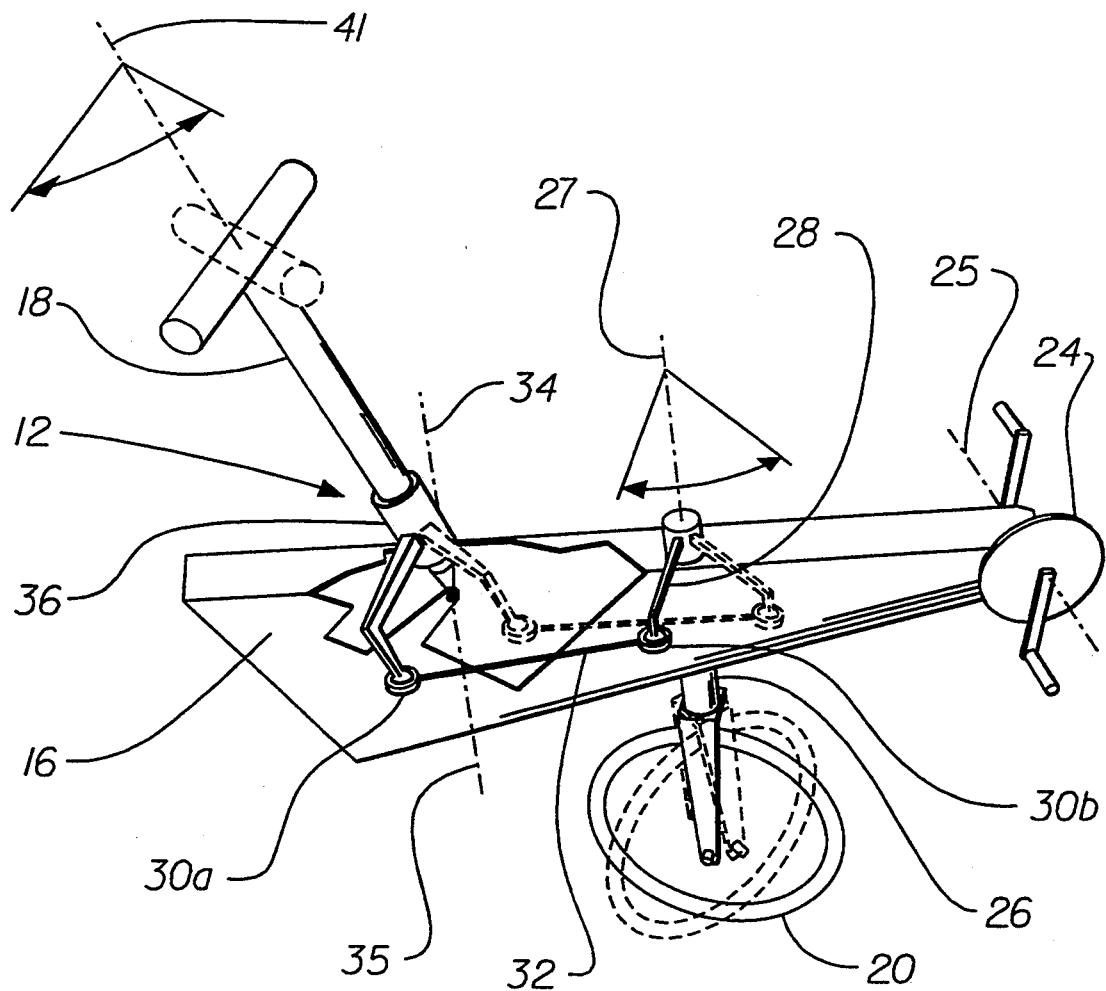
FIG. 5 is a perspective view showing the rotational steering control operation of my tilt steering mechanism.

FIG. 5 shows the rotational steering control operation of tilt steering mechanism 12. Tilt steering mechanism 12 is shown in detail in FIG. 5 in a substantially stationary fore aft position (i.e., fore aft tilt body 34 does not move). Generally, in a stationary fore aft position of tilt steering mechanism 12, rider 14 may effect rotational steering control over front steerable wheel 20 by turning handlebar element 18. More specifically, when handlebar element 18 is made to rotate about rotational antifriction bearing axis 41, steering lever body 36 along with ball and socket joint 30a will be made to do the same. Because the approximate rotational center of all and socket joint 30a does not lie on rotational antifriction bearing axis 41, the fore mentioned rotation of handlebar element 18 will effect an orbital movement of ball and socket joint 30a about rotational antifriction bearing axis 41. The orbital movement of ball and socket joint 30a will have a forward component of movement or a rearward component of movement in relation to frame 16. These components of movement will be transferred to steerer tube lever 28 through connection rod 32 and similar end mounted ball and socket joint 30b. Upon receiving a forward component of movement or a rearward component of movement from ball and socket joint 30b, steerer tube lever 28 will effect a rotational movement of front steerer tube fork assembly 26 about front steerer tube fork assembly axis 27, whereby steering control of front steerable wheel 20 will be possible.

Thus the reader will see that the tilt steering mechanism described above facilitates a large amount of adjustment of a rider's position while the rider and bicycle are in motion without compromising or affecting steering comfort or control. While there is shown and described herein specific structure embodying the invention, it will be manifest to those skilled in the art that various modifications and rearrangements of the parts may be made without department from the spirit and scope of the underlying inventive concept and that the same is not limited to the particular forms herein shown and described except insofar as indicated by the scope of the appended claims.

I claim:

1. A tilt steering mechanism for use in connection with a bicycle comprising a foot pedal driving means rotatable about an axis and a front steerable wheel whereby the axis of said foot pedal driving means is located forwardly of the rear most point of said front wheel, said tilt steering mechanism comprising:

a) a fore aft tilt body adapted to be rotatably mounted on said bicycle whereby said fore aft tilt body is located completely rearward of the axis of said foot pedal driving means and said fore aft tilt body is pivotal about a pivot axis which is substantially parallel to the axis of said foot pedal driving means;

b) a steering lever body rotatably connected to said fore aft tilt body by a rotational antifriction bearing whereby said steering lever body is pivotal about a rotational antifriction bearing axis which is substantially orthogonal to said fore aft tilt body axis; and c) a device:

comprising, a joint having at least two degrees of rotational movement about separate distinct joint axes, said device mounted on said steering lever body whereby rotational manipulation of said steering lever body will cause said device to move in an orbital fashion about said rotational antifriction bearing axis and wherein one of said separate distinct joint axes is coincident with said fore aft tilt body pivot axis when said steering lever body is located in a substantially neutral steering position.

2. The tilt steering mechanism of claim 1 further including a handlebar element mounted to said steering lever body.

3. The tilt steering mechanism of claim 1 wherein said steering lever body is further characterized as having a shape including an integrated handlebar element.

4. The tilt steering mechanism of claim 1, further including a coupling linkage for linking said device to a front steerer tube fork assembly whereby manipulation of said steering lever body effects steering of said front steerer tube fork assembly.

5. The tilt steering mechanism of claim 1, wherein said device comprises a ball and socket joint.

6. A tilt steering mechanism for use in connection with a bicycle comprising a foot pedal driving means rotatable about an axis and a front steerable wheel whereby the axis of said foot pedal driving means is located forwardly of the rear most point of said front wheel, said tilt steering mechanism comprising:

a) a handle bar element having a substantially vertical stem and a substantially horizontal cross member;

b) a lever means mounted to a lower end of said vertical stem of said handlebar element and extending outward and substantially parallel with said horizontal cross member;

c) a mechanism having at least two degrees of rotational movement about separate distinct axes connected to an outer end of said lever means; and c) a fore aft tilt body rotatably connected to the lower end of said vertical stem of said handlebar element by a rotational antifriction bearing, said fore aft tilt body being rotatably mounted on said bicycle whereby said fore aft tilt body is pivotal about a pivot axis which is substantially parallel to the axis of said foot pedal driving means, and said fore aft tilt body is located completely rearward of the axis of said foot pedal driving means, wherein one axis of rotational movement of said mechanism is coincident with said fore aft tilt body pivot axis when said handlebar element is located in a substantially neutral steering position.

7. The tilt steering mechanism of claim 6, further including a coupling means for linking said device to a front steerer tube fork assembly, whereby manipulation of said handlebar element effects steering of said front steerer tube fork assembly.

8. The tilt steering mechanism of claim 6, wherein said mechanism comprises a ball and socket joint.

* * * * *